United States Patent [19]

Kemmner

[11] 4,402,344

[45] Sep. 6, 1983

[54] ADJUSTING DEVICE FOR CONTROLLING A FLOWTHROUGH CROSS SECTION

[75] Inventor: Ulrich Kemmner, Stuttgart, Fed. Rep. of Germany

[73] Assignee: Robert Bosch GmbH, Stuttgart, Fed. Rep. of Germany

[21] Appl. No.: 264,247

[22] Filed: May 18, 1981

[30] Foreign Application Priority Data

May 20, 1980 [DE] Fed. Rep. of Germany ....... 3019178

[51] Int. Cl.³ .............................................. F16K 31/06

[52] U.S. Cl. ................................ 137/625.33; 251/140; 251/DIG. 3

[58] Field of Search .......................... 251/DIG. 3, 140; 137/625.33

[56] References Cited

U.S. PATENT DOCUMENTS

| | | | |
|---|---|---|---|
| 1,106,633 | 8/1914 | Denehie | 137/625.33 |
| 2,922,614 | 1/1960 | Nickells | 251/140 X |
| 3,896,834 | 7/1975 | Paul, Jr. | 251/DIG. 3 |

FOREIGN PATENT DOCUMENTS

| | | | |
|---|---|---|---|
| 2316453 | 10/1974 | Fed. Rep. of Germany | 251/DIG. 3 |
| 711693 | 6/1931 | France | 137/625.33 |
| 466959 | 12/1980 | France . | |
| 376764 | 5/1923 | U.S.S.R. | 251/DIG. 3 |

*Primary Examiner*—Arnold Rosenthal
*Attorney, Agent, or Firm*—Edwin E. Greigg

[57] ABSTRACT

An adjusting device is proposed for controlling flowthrough cross sections of a line carrying operating medium in internal combustion engines. The throttle device which varies the flowthrough cross section is disposed, together with the electromechanical actuating member thereof, within a tubular housing and surrounded by an annular chamber. The dispensed operating medium flows from one connecting pipe to the other connecting pipe of the adjusting device through the annular chamber. In this manner, an adjusting device is created which can be built into hose-type lines in a linear fashion; the electromechanical actuating member, for instance an adjusting magnet, is necessarily cooled by the surrounding flow of the operating medium to be dispensed. Furthermore, a body having the form of a helical spring serves as a throttle device of the adjusting device. When it is compressed, this body, together with a flexible element, interrupts the communication between the annular chamber and the adjacent line.

13 Claims, 2 Drawing Figures

ADJUSTING DEVICE FOR CONTROLLING A FLOWTHROUGH CROSS SECTION

EACKGROUND OF THE INVENTION

The invention is based on an adjusting device for controlling a flowthrough cross section. An adjusting device of this kind, known from French Pat. No. 466,959, however, has a very complicated design and is of substantial structural size. Heavy, angular or straight connecting pieces are required for the lines.

Slides are also used for controlling the flow-through cross section. With such slides, which are guided in a sheath and control radial flowthrough openings in the sheath, the clearance between the slide and the sheath must be very small so that the leakage quantity will also be kept small. This causes an increased risk of tilting out of position as well as increased friction, which has an unfavorable effect on the hysteresis behavior of the adjusting device.

OBJECT AND SUMMARY OF THE INVENTION

The adjusting device according to the invention has the advantage over the prior art that the throttle device can be actuated substantially without friction, while maintaining all the necessary properties required for adjusting devices of this type. Furthermore, compact structural size can be attained, the adjusting device being advantageously incorporated directly into the line which carries the operating medium to be dispensed, without necessitating a change in direction of the line. It is also advantageous that a smooth outer form is attainable, offering the possibility of suspending the adjusting device in a moment-free manner. As a result, advantageous modifications of the adjusting device are possible.

The invention will be better understood and further objects and advantages thereof will become more apparent from the ensuing detailed description of a preferred embodiment taken in conjunction with the drawing.

DESCRIPTION OF THE PREFERRED EMBODIMENT

Figure 1:
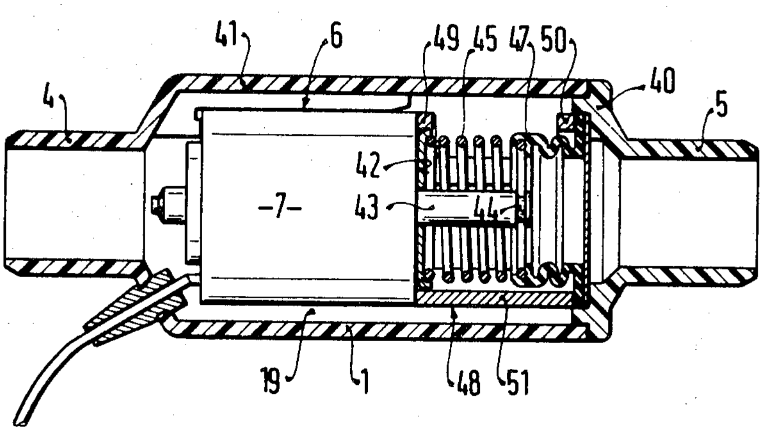
FIG. 1 is a cross sectional view taken through an exemplary embodiment of the adjusting device according to the invention, having a throttle device embodied by a helical spring.
Figure 2:
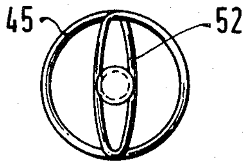
FIG. 2 is a axial plan view of the end of the throttle device of FIG. 1.

Turning now to FIG. 1, regulating the idling rpm is an important means of keeping the toxic exhaust component low and reducing fuel consumption in internal combustion engines, while taking wear into consideration over the entire life of the vehicle. To this end, adjusting devices are required which control one component of the operating mixture which is combusted in the combustion chambers of the engine by means of an appropriately embodied regulating device. One such component of the operating mixture may be supplementary air, for instance.

The adjusting device shown in FIG. 1 has a tubular housing 1 which may be fabricated of plastic. This tubular housing 1 merges with a first pipe socket 4 at one end and a second pipe socket 5 or flowthrough member at the other end. While the first pipe socket 4 and the tubular housing 1 are in one piece, the second pipe socket 5 is provided with a flange 40, which is placed on the inside of the tubular housing 1, acting as the first end side. In the interior of the tubular housing 1, in turn, a cylindrical housing 7 of an electromechanical actuator 6 is held both radially and axially by means of support ribs 41 distributed uniformly about the circumference; as a result, the cylindrical housing 7 is located in the axial center of the tubular housing 1.

A rod-like actuating device 43, on the free end of which an annular groove 44 is provided, protrudes axially to one end side 42 of the cylindrical housing 7 and oriented toward the second pipe socket 5. This rod-like actuating device may, for example, be an extension of the armature of an adjusting magnet. A helical body 45, for instance a coiled spring, is disposed coaxially with this rod-like actuating device 43. At one end, the helical body 45 rests tightly against one end side 42 of the cylindrical housing 7 and at the other end it is tightly snapped, clamped or secured in some other matter to a flexible bellows 47 or diaphragm. The other end of the flexible bellows is rigidly and tightly connected with the inner side of the flange 40, which may be effected, for example, by means of a cage-like body 48, clamped between one end side 42 and the inner side of the flange 40. This cage-like body 48 comprises two rings 49 and 50, which are interconnected by longitudinally extending means 51. On the end of the helical spring 45 oriented towards the bellows, the spring is deformed into a clip 52, which can be snapped into the annular groove 44 and furnishes the connection with the rod-like actuating device 43. In the illustrated position, an annular chamber 19 is formed between the cylindrical housing 7, the helical spring 45 and the bellows 47. At one end, the annular chamber 19 communicates continuously with the first pipe socket 4, and on the other end it may be made to communicate with the second pipe socket 5 by means of the interstices between the spring coils. In the illustrated position, this connection has been established. If the adjusting magnet in the cylindrical housing 7 is excited, however, and the rod-like actuating device 43 is retracted, then the interstices between the coils of the helical springs 45 close completely in the one extreme position of the adjusting magnet. The connection between the annular chamber 19 and the pipe socket 5 is now completely interrupted by means of the flexible bellows 47, which has also moved accordingly. With the displacement of the rod-like actuating device in the opposite direction, the free cross section between the annular chamber 19 and the second pipe socket 5 can be continuously increased.

The helical body 45 is fabricated of some suitable material, for instance, a steel spring, the surface of which is coated with plastic. This sealing material assures that in the closed position, the spring windings will rest tightly against one another to thereby form a seal.

The electromechanical actuation device may be a rotary adjuster or an electro motor, instead of an adjusting magnet. In this case, the rod-like actuating device does not change in length; instead, it has a helical thread on its circumference which is engaged by an appropriately embodied element having an internal thread which is connected with the end of the helical spring 45. However, this means of actuation involves much more friction than does the method described above.

The device described has the very substantial advantage that the adjusting device and the blocking element are united in a single structural element. The actuation of the blocking device is effected substantially without friction, in particular when an adjusting magnet is used. The adjusting device is very simple in structure and can be assembled in a very favorable manner. With this device, manufacturing tolerances need be taken into account to only a very limited extent.

In the device shown in FIG. 1, the helical spring 45 is in its relaxed position; that is, the adjusting magnet is free of electrical current. If the adjusting magnet is subjected fully to electrical current, then the helical spring is fully compressed. Operation in reverse fashion can be obtained if the helical spring is not a compression spring but is rather a tension spring, whose windings are pulled apart as a result of the displacement of the rod-like actuating device. This is advantageous whenever no secondary air, for example, is required during normal operation of the engine.

The foregoing relates to a preferred exemplary embodiment of the invention, it being understood that other embodiments and variance thereof are possible within the spirit and scope of the invention, the latter being defined by the appended claims.

What is claimed and desired to be secured by Letters Patent of the United States is:

1. An adjusting device in a line for controlling flow of an operating medium for internal combustion engines, said adjusting device having an electromechanical actuating member including a housing body portion and a cage portion and a throttle device actuated by said electromechanical actuating member and arranged to control flow of said operating medium through said line, characterized in that said electromechanical actuating member has an axially extending rod-like actuating device extending into said cage portion, said throttle device including a helical spring body that surrounds said rod-like actuating device and has spaced coils through which said operating medium flows, said rod-like actuating device having an end portion connected with a second end of said helical spring body which surrounds said rod-like actuating device within said cage portion, said helical spring body further having a first end portion arranged to rest tightly against a wall forming one end of said electromechanical actuating member housing body portion, a flexible element having a first end secured to one end of said cage portion and a second end portion tightly connected with said second end portion of said helical spring body, whereby a spacing of the coils of said helical spring is controlled by said rod-like actuating device to determine flow of said operating medium through said coils of said helical spring body and said line.

2. An adjusting device is defined by claim 1, characterized in that said helical spring body is a compression spring.

3. An adjusting device is defined by claim 1, characterized in that said helical spring body is a tension spring, which is firmly connected on one side with said one end wall of said actuating member.

4. An adjusting device as defined in claim 2 characterized in that said coils of said helical spring body are coated with elastic sealing material.

5. An adjusting device as defined in claim 2, characterized in that said actuating device further includes an annular recessed area in said one end wall, and said helical spring body has a portion which is received in said recessed area and said actuating device is an adjusting magnet.

6. An adjusting device as defined in claim 3, characterized in that the actuating device further includes an annular recessed area in said one end wall, and said helical spring body has a portion which is received in said recessed area and said actuating device is an adjusting magnet.

7. An adjusting device as defined in claim 4, characterized in that the actuating device further includes an annular recessed area in said one end wall, and said helical spring body has a portion which is received in said recessed area and said actuating device is an adjusting magnet 8. An adjusting device as defined in claim 2, characterized in that said actuating device comprises a shaft of said electromechanical device and further that said flexible element connected to said second end of said helical spring body is a diaphragm.

9. An adjusting device as defined in claim 3, characterized in that said actuating device comprises a shaft of said electromechanical device and further that said flexible element connected to said second end of said helical spring body is a diaphragm.

10. An adjusting device as defined in claim 4, characterized in that said actuating device comprises a shaft of said electromechanical device and further that said flexible element is connected to said second end of said helical spring body is a diaphragm.

11. An adjusting device as defined by claim 1, characterized in that said actuating member and said throttle device are disposed coaxially in series within a tubular housing having an inner wall and wherein said last named elements form an annular chamber and further that said tubular housing is provided at opposite end areas with flow through means, which are connected with said line carrying said operating medium.

12. An adjusting device as defined in claim 3, characterized in that said coils of said helical spring body are coated with elastic sealing material.

13. An adjusting device as defined in claim 12, characterized in that the actuating device further includes an annular recessed area in said one end wall, and said helical spring body has a portion which is received in said recessed area and said actuating device is an adjusting magnet.

* * * * *